UNITED STATES PATENT OFFICE.

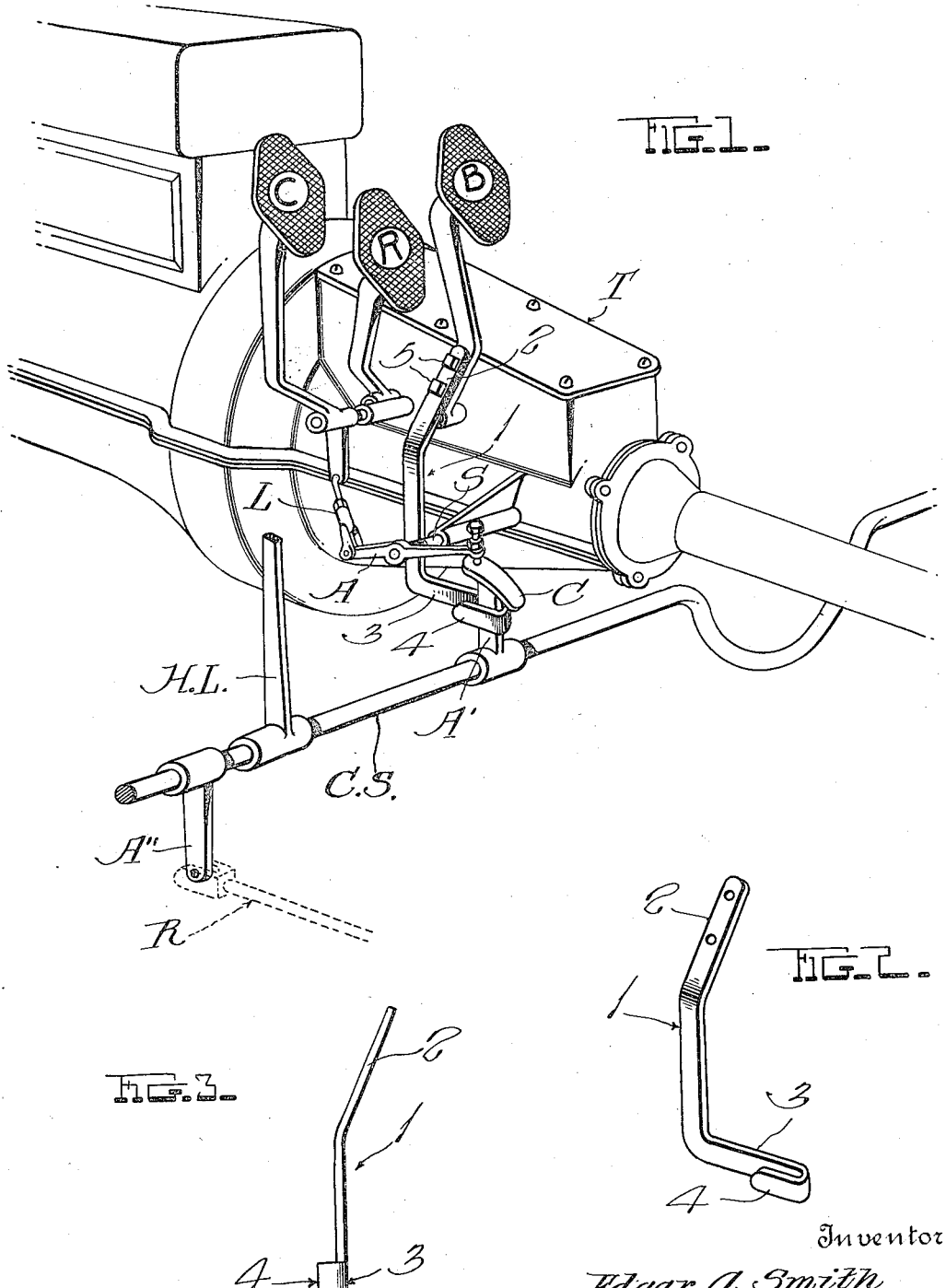

OSCAR RHODES SMITH AND EDGAR ARMITAGE SMITH, OF WINDSOR, NORTH CAROLINA.

BRAKE-OPERATING ATTACHMENT FOR AUTOMOBILES.

1,295,226.     Specification of Letters Patent.     Patented Feb. 25, 1919.

Application filed June 4, 1917. Serial No. 172,783.

*To all whom it may concern:*

Be it known that we, OSCAR RHODES SMITH and EDGAR ARMITAGE SMITH, citizens of the United States, residing at Windsor, in the county of Bertie and State of North Carolina, have invented certain new and useful Improvements in Brake-Operating Attachments for Automobiles; and we do declare the following to be a full, clear, and exact description of the invention, such as will enable others skilled in the art to which it appertains to make and use the same.

Our invention has for its object to improve upon the construction shown in our co-pending U. S. application Serial No. 172,782, the intention being to simplify and thus reduce the cost of the device without in any manner decreasing its efficiency.

With the foregoing general object in view, the invention resides in certain novel features of construction and combinations of parts hereinafter fully described and claimed, the descriptive matter being supplemented by the accompanying drawing which constitutes a part of this application, and in which, Figure 1 is a perspective view of the transmission housing of a Ford automobile and the parts associated therewith, showing the invention applied;

Fig. 2 is a perspective view of the attachment removed from the machine, and

Fig. 3 is a rear elevation of the device.

In the drawings above briefly described, T designates the transmission housing of a Ford automobile, C the clutch pedal, R the reverse pedal, and B the service brake pedal. The clutch pedal C is connected by the usual link L with the rocker arm A of the clutch controlling shaft S, said arm coöperating with the cam C on the upstanding crank arm A' of the transverse control shaft C S. The shaft C S is provided with depending crank arms A'' usually connected with the brake rods R which lead to the emergency brakes within the drums of the rear wheels, and said shaft is equipped with the hand lever H L by means of which it may be rocked. The operation of the parts so far described is well known, the hand lever H L serving through the medium of the parts A', C, A and S to throw the clutch out and to also apply the emergency brakes when said hand lever H L is pulled rearwardly. In some cases, however, the rods R are detached so that the emergency brakes are not applied, but due to the nature of the present invention, the service brake pedal B is automatically depressed when the lever H L is pulled rearwardly.

The present invention consists of a one-piece arm or bar 1 whose upper end is bent into an inclined position as shown at 2 for contact with the similarly located lower end of the service brake pedal B, the lower end of said bar being bent rearwardly to form an arm 3 whose rear end is bent substantially upon itself to provide a hook or elongated loop 4 which receives the arm A' of the controller shaft C S. The end 2 of the bar 1 may be secured to the pedal B by any preferred means but a pair of machine screws 5 are preferably passed through these parts as shown.

When the device is applied, the vertical portion of the bar 1 extends below the pivot of the pedal B so that when the shaft C S is rocked rearwardly by the lever H L, the arm A' will pull rearwardly on the parts 3 and 4 and will thus so move the entire bar as to depress said pedal B, thus applying the service brake. The invention will therefore lock the car against movement when the lever H L is pulled rearwardly to throw the clutch out, even though the emergency brakes be disconnected. If these brakes be employed, however, both sets of brakes will be applied simultaneously with throwing the clutch out by a rearward pull on the lever H L, thus providing a braking mechanism which will produce the maximum amount of work.

From the foregoing, taken in connection with the accompanying drawing, it will be obvious that although the improved device is of a much more simple and inexpensive nature than that above referred to, it will be equally as efficient.

We claim:

1. The combination with the forwardly moving brake pedal for applying the service brake of an automobile, the transverse rock shaft for applying the emergency brakes, the hand lever for operating said shaft, and the upstanding crank arm for throwing the clutch out when said shaft is operated; of a rigid arm secured to the lower end of said brake pedal and extending below the pivot thereof, the lower end of said arm being extended rearwardly and formed into an elongated loop slidably receiving said crank arm substantially as and for the purpose set forth.

2. A brake attachment of the class described comprising a rigid arm and means for securing its upper end to the foot brake pedal of an automobile, the lower end of said arm being extended rearwardly and formed with an open loop to loosely receive the upstanding crank arm on the transverse controller shaft for applying the emergency brakes.

3. A brake attachment of the class described comprising a one-piece metal bar whose upper end is bent to locate it in an inclined plane, and means for securing said end to the similarly shaped lower end of the foot brake pedal of an automobile, the lower end of said bar being bent rearwardly to form a horizontal arm and the rear end of the latter being bent substantially upon itself to provide an open loop for the reception of the upstanding crank arm of the transverse controller shaft for the emergency brakes.

4. A connecting piece for attachment to a brake pedal, comprising a main body portion consisting of two parts at about right angles to each other, a bent portion at the upper end of the upright part, and a hook at the outer end of the horizontal part, said connecting piece being of sufficient rigidity to carry the strain from the emergency brake operating parts to the foot brake.

In testimony whereof we have hereunto set our hands in the presence of two subscribing witnesses.

OSCAR RHODES SMITH.
EDGAR ARMITAGE SMITH.

Witnesses:
  N. S. PRITCHARD,
  L. D. PERRY.